United States Patent
Laffey et al.

(10) Patent No.: US 11,438,161 B2
(45) Date of Patent: Sep. 6, 2022

(54) IMPLICIT ATTESTATION FOR NETWORK ACCESS

(71) Applicant: HEWLETT PACKARD ENTERPRISE DEVELOPMENT LP, Houston, TX (US)

(72) Inventors: Thomas M. Laffey, Roseville, CA (US); Charles F. Clark, Roseville, CA (US)

(73) Assignee: Hewlett Packard Enterprise Patent Department, Spring, TX (US)

( * ) Notice: Subject to any disclaimer, the term of this patent is extended or adjusted under 35 U.S.C. 154(b) by 228 days.

(21) Appl. No.: 16/671,088

(22) Filed: Oct. 31, 2019

(65) Prior Publication Data
US 2021/0135872 A1   May 6, 2021

(51) Int. Cl.
| H04L 9/32 | (2006.01) |
| H04L 9/40 | (2022.01) |
| H04L 9/08 | (2006.01) |

(52) U.S. Cl.
CPC .......... *H04L 9/3234* (2013.01); *H04L 9/0869* (2013.01); *H04L 9/3218* (2013.01); *H04L 9/3247* (2013.01); *H04L 63/061* (2013.01); *H04L 63/0823* (2013.01); *H04L 63/0853* (2013.01); *H04L 63/10* (2013.01)

(58) Field of Classification Search
CPC ... H04L 9/3234; H04L 9/0869; H04L 9/3218; H04L 9/3247; H04L 63/061; H04L 63/0823; H04L 63/0853; H04L 63/10
See application file for complete search history.

(56) References Cited

U.S. PATENT DOCUMENTS

| 7,751,568 | B2 | 7/2010 | Catherman et al. |
| 7,913,086 | B2* | 3/2011 | Kostiainen ............. G06F 21/57 713/176 |
| 8,104,073 | B2 | 1/2012 | Hanna |
| 2005/0138384 | A1* | 6/2005 | Brickell .................. G06F 21/57 713/182 |
| 2009/0063857 | A1* | 3/2009 | Bade ....................... G06F 21/53 713/164 |
| 2010/0070800 | A1 | 3/2010 | Hanna |
| 2014/0205092 | A1* | 7/2014 | Hartley ................. H04L 9/0897 380/44 |

(Continued)

FOREIGN PATENT DOCUMENTS

WO   2008/000721 A1   1/2008

OTHER PUBLICATIONS

Jan De Clercq, "Trusted Platform Module (TPM) Key Attestation", Mobile Management and Security, available online at <https://www.itprotoday.com/mobile-management-and-security/trusted-platform-module-tpm-key-attestation>, Mar. 19, 2015, 4 pages.

*Primary Examiner* — Vance M Little
(74) *Attorney, Agent, or Firm* — Nolte Lackenbach Siegel

(57) ABSTRACT

A method and apparatus for use in a trusted network environment together or separately employ an implicit attestation that a requesting computing resource is in a trusted state before access to a network resource is granted. The method includes: verifying that a requesting computing resource is in a trusted state; accessing the private key using the released key authorization value; and creating a digital signature for the requesting device from the accessed private key. The apparatus may implement the method.

20 Claims, 7 Drawing Sheets

(56) References Cited

U.S. PATENT DOCUMENTS

2015/0113618 A1* 4/2015 Sinha .................... H04L 63/107
                                                                 726/6
2016/0246736 A1* 8/2016 Lee ......................... F04B 33/00
2020/0287960 A1* 9/2020 Higuchi .................. H04W 4/44

* cited by examiner

IMPLICIT ATTESTATION FOR NETWORK ACCESS

BACKGROUND

Despite the many benefits of using networks, networking raises a greater potential for security issues such as data loss, security breaches, malicious attacks, etc. The art has therefore diligently developed techniques including many different kinds of preventative measures to build a "trusted network environment" to prevent, or at least mitigate, these kinds of threats. Typical preventative measures to address these security issues include the employment of firewalls, anti-virus software, and data encryption.

A Trusted Platform Module ("TPM") is a secured cryptoprocessor, sometimes referred to as a "TPM chip" or "TPM security device," implemented and operating in accordance with the TPM industry standard for securing hardware devices through secure information. A TPM is used to perform cryptographic operations to store secure information that may be used to authenticate hardware in a trusted network environment. Such secure information may include, depending on the implementation, signing keys and other kinds of information, for example. A TPM chip may be implemented as a specialized chip on an endpoint device that stores encryption keys specific to that endpoint device (e.g., the host system) for hardware authentication. Each TPM chip contains a number of registers intended to permit a relying party to obtain unforgeable information about the platform state.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

Figure 1:
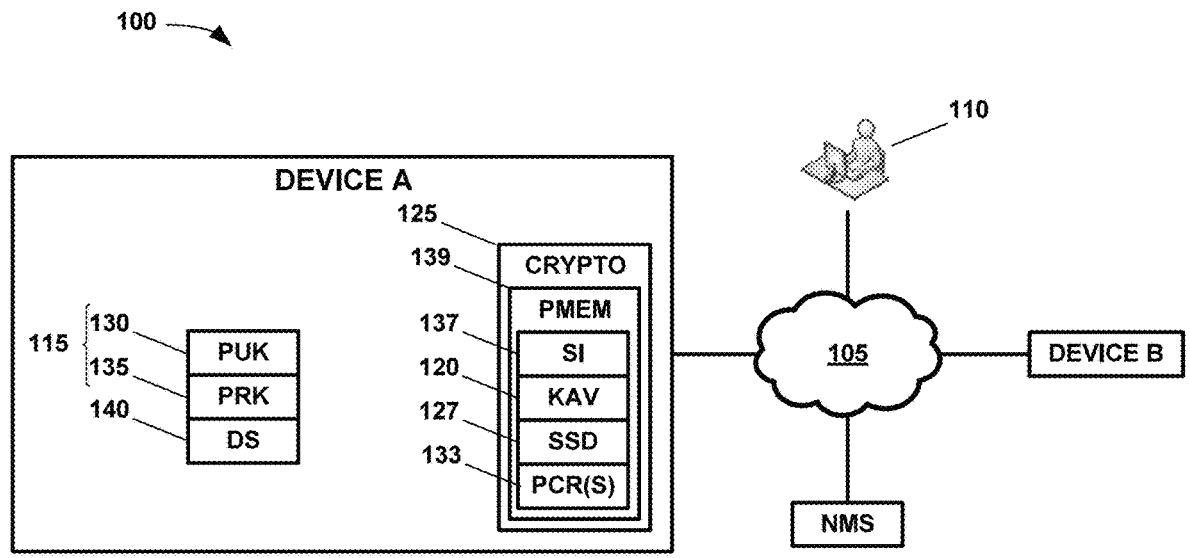
FIG. 1 depicts selected portions of a trusted network environment in which some examples of the technique disclosed herein may be used.

While the techniques and devices of this disclosure are susceptible to various modifications and alternative forms, the drawings illustrate specific examples herein described in detail by way of example. It should be understood, however, that the description of specific examples is not intended to be limiting to the particular forms disclosed, but on the contrary, the intention is to cover all modifications, equivalents, and alternatives falling within the spirit and scope of the appended claims.

DETAILED DESCRIPTION

Illustrative examples of the subject matter claimed below may now be disclosed. In the interest of clarity, not all features of an actual implementation are described for each implementation provided in this specification. It may be appreciated that in the development of any such actual implementation, numerous implementation-specific decisions may be made to achieve the developers' specific goals, such as compliance with system-related and business-related constraints, which may vary from one implementation to another. Moreover, it may be appreciated that such a development effort, even if complex and time-consuming, would be a routine undertaking for those of ordinary skill in the art having the benefit of this disclosure.

In general, the presently disclosed technique couples "system state validation" to a secure network admission process. This permits a secure state to be defined a priori and requires this state to be maintained—or the device is to be remediated. In a secure network admission process, this "implicit" attestation of device state (e.g., availability of a Locally significant Device Identity ("LDevID") key from a TPM) eliminates performing attestation (platform state evaluation) before network access is granted. This implicit attestation may both speed network admission in the normal case and also prevent denial of service should the otherwise provided central verification/evaluation service be unavailable or busy. This method may retain the security of the network access while improving network uptime, particularly after a power disruption (when all devices boot).

As used herein, "implicit attestation" is an immediate evidence that a user profile or device is in the configured trusted state and is therefore authorized to connect to the production network once authenticated through use of a secure network admission protocol (e.g., 802.1X). The approach described herein is able to provide immediate evidence of trusted state because, in the illustrated examples, the certification authority ("CA") signing the LDevID certificate and the recipient of that certificate know that the signing key used to create the digital signature for the proof of possession is only available for use when the computing resource is in a trusted state as enforced by the implicit attestation mechanism. That is, the device is in a state accepted by the CA at the time of proof of possession issuance or a trusted state determined transitively from that initial state. As is described in more detail herein, an authentication process described herein permits implicit attestation of a user or device to access a network device or network application.

Some examples disclosed herein include a method for use in implicit authentication in a trusted network environment, comprising: verifying that a requesting computing resource is in a trusted state; accessing the private key using the released key authorization value; and creating a digital signature for the requesting device from the accessed private key. In these examples, verifying that a requesting computing resource is in a trusted state may include: presenting, by the requesting computing resource, an encapsulated and encrypted current secure information to a cryptoprocessor, the secure information defining a trusted state for the requesting computing resource and including a key authorization value used to generate an asymmetric key pair for the requesting device, the asymmetric key pair including a private key; comparing, by the cryptoprocessor, the current secure information with the trusted secure information previously encapsulated, encrypted, and stored in a protected memory by the cryptoprocessor; and releasing the key authorization value to the requesting computing resource in response to the comparison indicating the requesting computing resource is in the trusted state.

Other examples may include an apparatus for use in a trusted network environment, the apparatus comprising: a cryptoprocessor; a protected memory communicatively coupled to the cryptoprocessor; encrypted and encapsulated trusted secure information residing in the protected memory; a second memory communicatively coupled to the cryptoprocessor; and instructions residing in the protected memory. The trusted secure information defines a trusted state for a computing resource and includes a key authorization value used in accessing an asymmetric key pair including a private key for the computing resource. The instructions, when executed by the cryptoprocessor, cause the cryptoprocessor to: receive, from the computing resource, an encapsulated and encrypted current secure information; decrypt and de-encapsulate the current secure information and the stored trusted secure information; compare the current secure information with the trusted secure information; and release the key authorization value to the computing resource based on the comparison indicating the computing resource is in the trusted state.

Still other examples may include a method for use in a trusted network environment, comprising: requesting by a requesting computing resource access to a network resource hosted by a hosting device; implicitly attesting by the requesting computing resource that the requesting computing resource is in a trusted state, the implicit attestation including accessing a proof of possession if the requesting computing resource is in a trusted state; forwarding by the requesting computing resource the proof of possession from the requesting computing resource to the hosting device; and permitting the requesting computing resource to access the network resource upon receipt of the implicit attestation by the hosting device.

Turning now to the drawings, and referring to FIG. 1, when a new device—e.g., device A—is introduced into a trusted network environment 100, it is enrolled and provisioned into the network 105. The manner in which this is done will be implementation specific. For instance, in some examples, the network 105 may be managed and supervised using a software tool such as a Network Management System ("NMS"). In these examples, the NMS may enroll and provision device A. Alternatively, in other examples, the new device may be enrolled and provisioned by a human Network Administrator 110 either in the presence or absence of a NMS. Still other examples may use some combination of automated software or human enrollment and provisioning.

The process disclosed herein, in one example, begins with the creation of an asymmetric key pair 115 with a key authorization value 120, both of which are associated with the device A. The asymmetric key pair 115 includes a private key 135 and a public key 130. The asymmetric key pair 115 may be, in some examples, a TPM key, for instance. As a part of the enrollment and provisioning, in accordance with the present example, a key authorization value 120 is randomly generated and assigned to device A by the entity performing the enrollment and provisioning. The key authorization value 120 is random and may be generated in any number of ways. Some examples may use a random number generator (not shown) of a cryptoprocessor 125 (e.g., a TPM chip) of the new device. Other examples might use a random number generator (also not shown) in device A that is not a part of the cryptoprocessor 125. Still other examples, particularly those in which the device is not a TPM device, might generate the key authorization value 120 in other ways.

The key authorization value 120 exhibits at least two characteristics. First, it should be randomly generated. Second, it should be long enough that it cannot reasonably be guessed in a statistical sense. In the examples illustrated and discussed herein, the key authorization value 120 is at least 160 bits (20 bytes) long. However, other examples may use a key authorization value 120 of a different length (e.g., at least 256 bits).

The key authorization value 120 is then used when accessing the asymmetric key pair 115, the asymmetric key pair 115 including a public key ("PUK") 130 and a private key ("PRK") 135. The format and structure of the asymmetric key pair 115 will be implementation specific depending upon a number of commonly encountered factors. Note that the key formats, when not encrypted (and the private key is encrypted/protected for this application) can differ by crypto suite. For example, an RSA key has one structure and an ECC key has a different structure. Both are asymmetric key pairs that consist of both a public and private key component. Typically, the crypto suite employed (e.g., RSA, ECC, etc.) will define a structure and format for the public key 130 and the private key 135.

The public key 130 and the private key 135 are "asymmetric" in the sense that they differ from one another. More particularly, the key authorization value 120 is presented to a cryptoprocessor 125 at the time of key creation as the parameters for using the private key 135—including the key authorization value 120—are defined at the time of key creation. The public key 130 is used to create certificates that accompany requests from device A to access network resources in a manner described more fully below. The private key 135 may be used to create a digital signature 140 for a response to a proof of possession request from the network resource, also in a manner described more fully below. Accordingly, the private key 135 and the key authorization value 120 are associated with the asymmetric key pair 115.

The asymmetric key pair 115 is protected by the cryptoprocessor 125 such that the private key 135 cannot be made visible or transferred to another cryptoprocessor 125 (not shown) or device. The asymmetric key pair 115 is related, or bound, to a specific identity (e.g., a type of the device, but possibly of a user profile person, both as described below) by a digital signature 140 on the proof of possession. The identity is that of the device or personal profile to be granted access to the trusted network environment 100.

Thus, the public key 130 may be disseminated widely throughout the trusted network environment 100 while the private key 135 is held "private" by device A. The private key 135 is therefore known only to device A to which it belongs. The asymmetric key pair 115 may be generated by a cryptoprocessor 125 such as a TPM chip that possesses the key authorization value 120.

In accordance with the present disclosure, the cryptoprocessor 125 stores "secure information" 137 in a "protected"

memory 139. The memory 139 is "protected" in the sense that it is protected from outside access—that is, only the cryptoprocessor 125 may access the protected memory. Thus, the cryptoprocessor 125 may access the secure information 137 in the protected memory but elements outside the cryptoprocessor 125 may not.

In the illustrated example, the cryptoprocessor 125 is a TPM chip and the protected memory includes a set of what are known as platform configuration registers ("PCRs") 133. The contents of the PCRs 133 is the "current state" of the device A in the illustrated example, the secure information 137 is the key authorization value 120 coupled with the secure state definition ("SSD") 127. The secure state definition 127 may be, for instance, the state of the PCRs 133 when the PCRs 133 are known to be in a "safe" or "trusted" state in a TPM implementation as described in one particular example herein. In some examples the key authorization value 127, alone, may constitute the secure information 137. In other examples, the key policies, alone, may constitute the secure information 137.

However, the secure information 137 may include other types of information in addition to or in lieu of one or more of the key authorization value 120 and the secure state definition 127. For instance, some TPM implementations may use policies to govern the cryptographic processes of the TPM chip. Policies are associated with the asymmetric key pair 115 to allow control of the asymmetric key pair 115 based on the system state as represented by the secure information 137 and secured state definition 127. One or more of these policies may be considered a part of the secure information 137 alone or in addition to the key authorization value 120 and/or the PCR trusted state.

The key authorization value 120 is then encapsulated with any other secure information 137 in a data structure and encrypted. The cryptoprocessor 125 may retain the encapsulated and encrypted secure information 137 which reflects the "secure state" or "trusted state" of the device. The encapsulated and encrypted secure information 137 is provided to device A hosting the cryptoprocessor 125.

Figure 2:
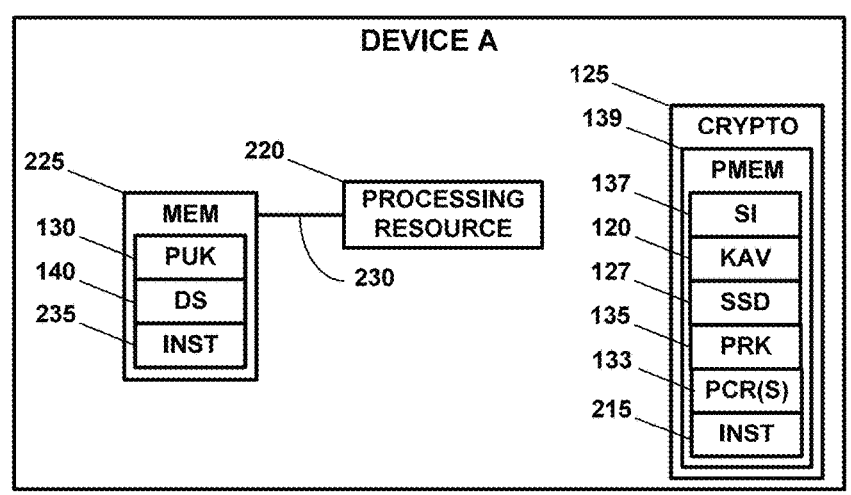
FIG. 2 schematically illustrates in a block diagram selected portions of a hardware and software architecture of a device in FIG. 1.

In the illustrated examples, the key authorization value 120 is stored by the TPM as a condition (or "password") that is provided for each use of the private key 135. As use of the private key 135 is authorized by use of the key authorization value 120, this authorization value 120 is be protected against use by untrusted software, so it must be stored securely. ("Untrusted software" is the software running on the Device prior to or without implicit attestation. In the illustrated examples, for instance, the instructions 235 contained in (untrusted) memory 225 shown in FIG. 2 is untrusted software. The memory contents are untrusted until the implicit attestation process proves that the instructions 235 match those of the trusted state.) Instead of saving the key authorization value 120 as cleartext on the system, the TPM encapsulates the key authorization value 120 along with the PCR values stored in the TPM's internal protected memory when the device is in a "secure" or "trusted" state.

The association is performed using the TPM SEAL operation, encrypting the information for storage in the system. A later TPM UNSEAL operation will then return the key authorization value 120 by decrypting the information only when the PCR values are in the secured (same) state. In other examples that are not implemented in a TPM device, TPM Policy may also be used to control key use. (The key is created with a policy requiring specific PCR values, etc.) However, the mechanisms for upgrading software ease with the TPM SEAL and TPM UNSEAL operations so that the same asymmetric key pair 115 can be used with moving from one secure state to a new one.

FIG. 2 schematically illustrates in a block diagram selected portions of a hardware and software architecture of device A in FIG. 1. The trusted secure information 137 including the key authorization value 120 and the secure state definition 127 reside in the protected memory 139 along with the private key 135. Also encoded in the protected memory 139 are a set of instructions ("INST") 215 that, when executed by the cryptoprocessor 125, cause the cryptoprocessor 125 to perform the actions described herein as attributable to the cryptoprocessor 125.

Device A also includes a processing resource 220 communicating with a memory 225 over a bus 230. The bus 230 may operate using any suitable bus protocol. The processing resource 220 may similarly be any suitable type of processing resource such as a microprocessor, a processor set, a controller, and a microcontroller. Note that this list is neither exhaustive nor exclusive. The implementation of these and other parts of the hardware and software architecture will depend in large part on the role of device A in the trusted network environment 100, shown in FIG. 1. The public key 130 resides on the memory 225 along with a set of instructions ("INST") 235. The instructions 235, when executed by the processing resource 220, cause the processing resource 220 to perform the functions attributed to device A herein excepting those functions attributed to the cryptoprocessor 125.

Figure 3:
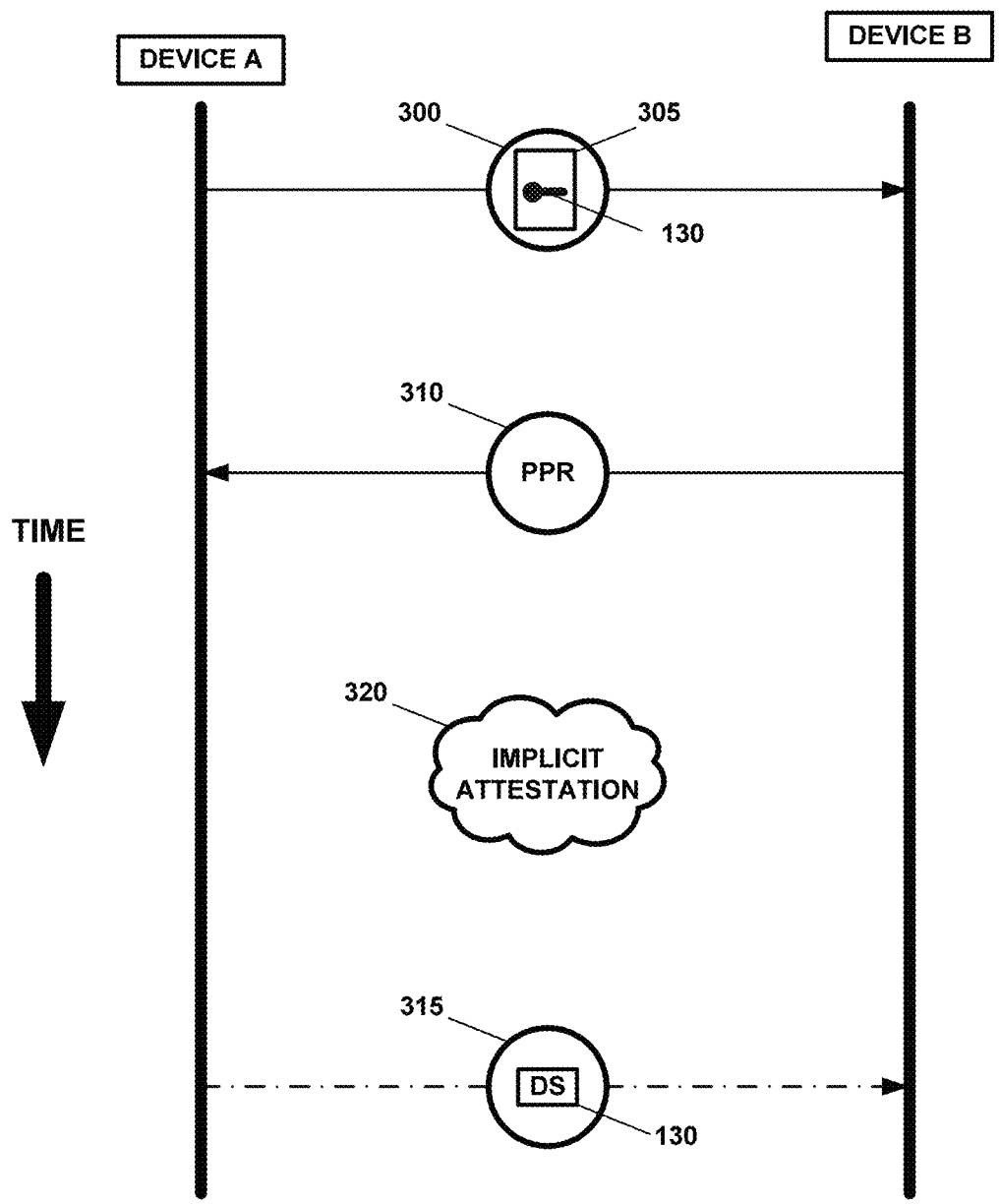
FIG. 3 illustrates a timeline of possible communications between two devices in the trusted network environment of FIG. 1 in accordance with one or more examples.

Turning now to operations, and referring collectively to FIG. 1 to FIG. 3, device A is enrolled and provisioned in the network 105. Device A includes the cryptoprocessor 125 with the protected memory 139. Device A also has been provided an asymmetric key pair 115 including a private key 135 and a public key 130 as described above. Device A also has retained the encapsulated and encrypted secure information 137 including a key authorization value 120 generated as described above.

When device A wishes to access a network resource (not shown) from another device B, device A sends a resource access request 300 including a certificate 305 to device B. The certificate includes device A's public key 130, which device B uses to verify device A's signature. Device B then sends a proof of possession request 310 to device A to establish that device A is still in a trusted state. The proper response from device A is to provide a proof of possession 315 including the digital signature 140 for device A. (This is shown in ghosted lines because the proper response 315 is contingent on device A being able to generate the digital signature 140 as described below.)

To generate the digital signature 140, device A accesses its private key 135. However, in accordance with the present disclosure, the cryptoprocessor 125 is guarding the private key 135 from unauthorized access. Thus, device A goes through an implicit attestation 320 as described herein, which then permits device A to access its private key 135 and formulate its digital signature 140 for the proof of possession 315.

To access the private key 135, device A provides the cryptoprocessor 125 (e.g., a TPM chip) its encapsulated and sealed key authorization value 120 and other secure information 137. The cryptoprocessor 125 decrypts (e.g., unseals) the encapsulated secure information 137 representing the trusted state (e.g. the PCR values in the trusted state) and compares it to the secure information 137 from the current state (e.g., the currently stored PCR values) in the protected memory 139. If there is a match, device A is still in a trusted state. The cryptoprocessor 125 then releases the key authorization value 120 to device A. Device A can then use the released key authorization value to request the cryptoprocessor 125 to allow use of the private key 135 so that device A can deliver a digital signature 140 to device B. If there is no match between the unsealed data and the protected memory 139, then device A is not in a trusted state. The request to device B for resource access will therefore fail because the digital signature is not supplied. Accordingly, the failure of device A to provide a proof of possession causes device A to enter remediation as described above.

Note that trusted software is trusted to "forget" the key authorization value and not store it somewhere. ("Trusted software" is the software running on the Device that has been implicitly attested to as being in a trusted state. In the illustrated examples, for instance, the instructions 235 contained in (untrusted) memory 225 shown in FIG. 2 may be trusted software once the implicit attestation process proves that the instructions 235 match those of the trusted state.) Thus, when the cryptoprocessor 125 releases the key authorization value 120 to the device A, the device A does not keep a copy.

Once the digital signature 140 is obtained, the device A discards the key authorization value 120 in a secure manner. Since the key authorization value is not stored, it may be temporarily held in a buffer, for instance, that may subsequently be purged once the digital signature 140 is obtained. There are methods known to the art to securely delete things in memory, disk drive, etc. that may be employed. The method might vary depending on memory technology (e.g., dynamic random-access memory, or "DRAM" versus static random-access memory, or "SRAM"). For instance, one possibly secure method for secure erasure in RAM would be to overwrite the data 4 times, with each byte of the data over-written in succession with the following bit patterns:

01010101
11111111
10101010
00000000

Figure 4A:
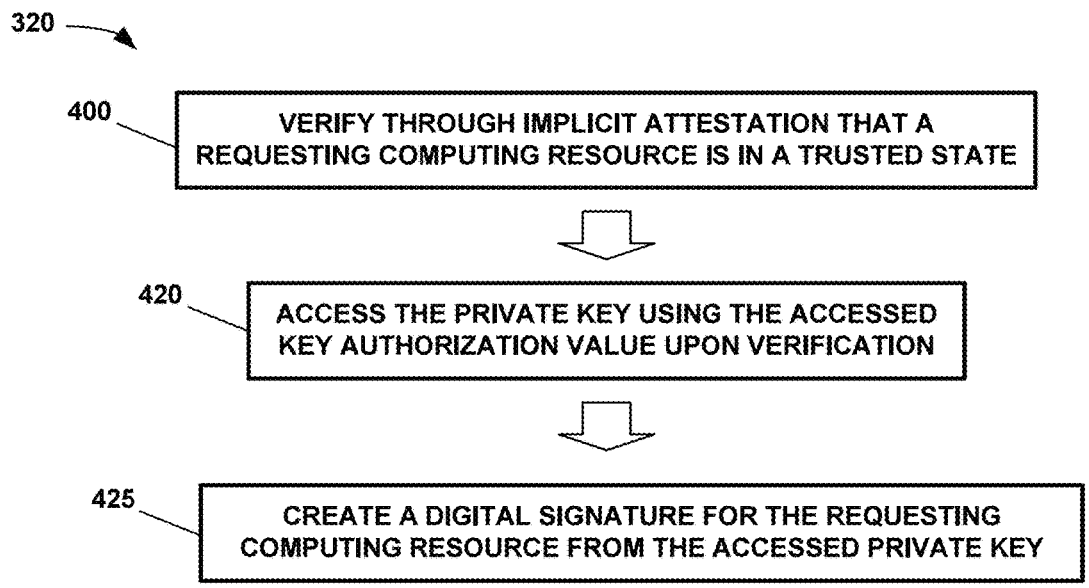
FIG. 4A-4B are flow charts for the operation of the device in FIG. 2 in the implicit attestation in the communications shown in FIG. 3.
Figure 4B:
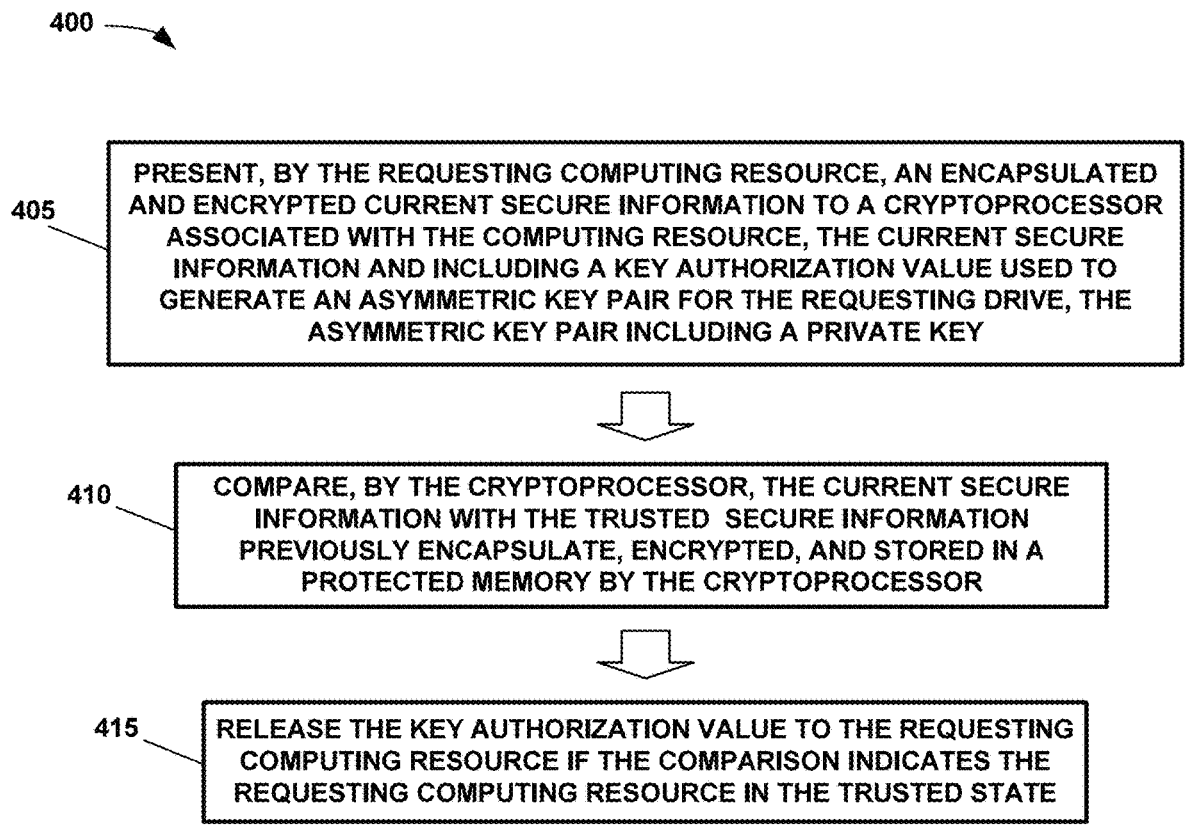

FIG. 4A-4B illustrate one particular example of the implicit attestation 320 of FIG. 3. The implicit attestation 320 begins in FIG. 4A by verifying (at 400) through implicit attestation that a requesting computing resource (e.g., device A in FIGS. 1-3) is in a trusted state. As shown in FIG. 4B, the verification (at 400) includes presenting (at 405), by the requesting computing resource, an encapsulated and encrypted current secure information to a cryptoprocessor associated with the requesting computing resource. The current secure information defines a current state for the requesting computing resource and includes a key authorization value used to authorize use of an asymmetric key pair for the requesting device. The asymmetric key pair includes a private key. Next, the cryptoprocessor compares (at 410), the current secure information with the trusted secure information previously encapsulated, encrypted, and stored in a protected memory by the cryptoprocessor. Upon a match, the key authorization value is then released (at 415) to the requesting computing resource if the comparison indicates the requesting computing resource is in the trusted state.

Returning to FIG. 4A, the implicit attestation 320 continues by accessing (at 420) the private key using the released key authorization value. This is then followed by creating (at 425) a digital signature for the requesting computing resource from the accessed private key. The digital signature can then be included in the proof of possession 315 (shown in FIG. 3) as described above.

In one particular example alluded to above, the present disclosure provides a manner for installing a TPM-based key and certificate on a device and then employing the use of the certificate for infrastructure network access such that a client device, network device, or user profile not in an expected state can be forced into remediation without centralized control. A method provided by the present disclosure couples system state validation to a secure network admission process which permits a secure state to be defined for the computing resource and then maintains the secured state. Accordingly, a secure network admission process eliminates, or at least reduces, attestation before network access is granted. A method described herein maintains the security of network access while also improving network uptime, particularly after a power disruption.

A TPM seal operation allows software to explicitly state a future trusted configuration that a platform should be in for a TPM chip to decrypt. Herein, a seal operation includes encrypting data in a manner that a TPM chip will later decrypt only in the event that the state of the protected memory (e.g., PCRs) has an expected value. The seal operation also implicitly includes the relevant platform configuration (e.g., platform configuration register values) when the seal operation was performed. The seal operation may use a value to bind a key blob to an individual TPM chip. Herein, a key blob is defined as a data type that can store secure binary data. Note that the specification for the TPM standard defines a key blob using a specific format. However, the specific format will vary depending on TPM version (e.g., 1.2, 2.0). A "blob" is "opaque" data whose format and meaning are known to an entity (e.g., the TPM chip or cryptoprocessor) but not to the entity that handles/stores it. In most cases (including the sealed data discussed herein) the blob is encrypted, making it look like random data—a so-called "bag of bits". Also, there could readily be other implementations using this method, but using some other format.

If the unseal operation succeeds, a demonstration that the platform configuration that was in effect when the seal operation was performed is returned to a requestor (e.g., client device, network device, or user profile), as well as the encrypted data. More particularly, the unseal operation succeeds when the PCRs are in the specified state. This demonstrates that the PCRs are in the state expected of a secure software system but does not prove that the initially selected state is actually secure. For implicit authentication (of a platform), the platform is authenticating to the relying party, or the party relying on the authentication, which is the authentication of interest.

For example, if a seal operation is used to store a key authorization value for a future configuration (e.g., to prove that the platform is a particular platform that is in a particular configuration) when, for instance, software is updated or new software installed. The key authorization value can be used only when the platform is in the future configuration. Accordingly, there is low interest in the platform configuration when the secret key is sealed. An example of this case is when sealing is used to store a network authentication key.

Further to the discussion of the TPM above, as used herein, a "TPM chip" is a kind of cryptoprocessor that is often implemented as a hardware chip operating in accordance with the TPM standard and designed to facilitate commodity computers to achieve high levels of security. Advantageously, a TPM chip can offer several kinds of functionality. For example, a TPM chip can offer protected storage such that user processes can store content that is encrypted by keys only available to the TPM chip. In addition, a TPM chip can offer platform measurement and reporting. For instance, a TPM platform—i.e., a device employing a TPM chip—can create reports of its integrity and configuration state that can be relied on by a remote verifier. A TPM chip can also provide platform authentication.

In at least one example, by installing a TPM-based key (e.g., a LDevID key as discussed above) and certificate on a device and using that certificate for infrastructure network access, a device not in the expected state may be forced into remediation without centralized control. A TPM key is created with a key authorization value—the TPM chip uses the key authorization value at the time of key creation and subsequently whenever the TPM private key is used. When a new device (a switch, router, access point, wide local area network ("WLAN") controller, server, etc.) is installed on a network in this particular example, it is provisioned with a Locally significant Device Identity ("LDevID") and an LDevID certificate. Note that device may initially have a factory installed Initial Device Identity ("IDevID") and IDevID certificate that uniquely identifies it. An IDevID allows what may be known as Zero Touch Provisioning of an "LDevID" certificate when the device is enrolled in a network. Without an IDevID, provisioning of an LDevID will typically involve some manual intervention.

When a device is "enrolled" into the local management environment, the TPM key is created using random data for the key authorization value. Since the key authorization value is quite large (at least 160 bits) guessing a key authorization value is statistically impossible. The key authorization value is stored in the system such that it can only be retrieved when trusted firmware or software is running.

The method of locking the TPM key authorization value to a trusted platform state uses a TPM feature called "sealing" as described above. When the system is booted, the software is "measured" into TPM registers called platform configuration registers ("PCRs"). This is part of the secure boot process. If one assumes that the PCR values indicate the trusted version of software, then a key authorization value SEALED to that state can be UNSEALED when the system is running the trusted software. Thus, when a TPM key is created for creation of a new LDevID certificate, the system is confirmed to be in a trusted state. This attestation phase is not described further herein. The present disclosure assumes that the system (e.g., a computing system such as Device A in FIG. 1 with which the TPM key is associated) has been checked and is in a trusted state and that the current PCR values reflect this state.

The new TPM key is then created with a random key authorization value. Once the key authorization value is sealed, the TPM returns with an encrypted blob containing the sealed data. The blob is saved and the actual key authorization value is securely destroyed. Thus, the key authorization value is never saved in cleartext.

Note that there are many PCRs in the TPM, so the selection of PCRs used in the SEALING may be implementation specific, according to which PCRs indicate the desired trust state of the system. For example, it may be that only the boot firmware (e.g., Unified Extensible Firmware Interface ("UEFI") or Basic Input/Output System ("BIOS")) software version is important so only the PCRs that reflect the state of that portion of system state are used in the SEAL operation. The SEALED random data is also persistently stored on the system for later use.

The TPM key created above is used for the creation of the LDevID certificate. The LDevID certificate will, from this time forward during its useful life, be used for "network admission". When the "upstream" network device receives a network access request, e.g., an 802.1X authentication request, it provides the LDevID certificate and signs data as set forth by the 802.1X or RADIUS protocol using the LDevID key.

When using the LDevID, the system first supplies the TPM with the SEALED data and requests an UNSEAL operation. If the system is in a trusted state (as defined by the TPM PCR values) then the TPM will release the key authorization value. The key authorization value is then used to load and use the LDevID key to perform a signing operation to allow the device to be able to join the network and pass traffic in the normal way.

Should the key retrieval operation fail, the network access request will also fail. Rather than simply denying access, the upstream network service instead grants access to a "remediation" network and notifies a configured network entity that the newly connected device failed network authentication. The remediation operations to be performed may include, for example, preventing the failed device from joining the production network.

Figure 5:
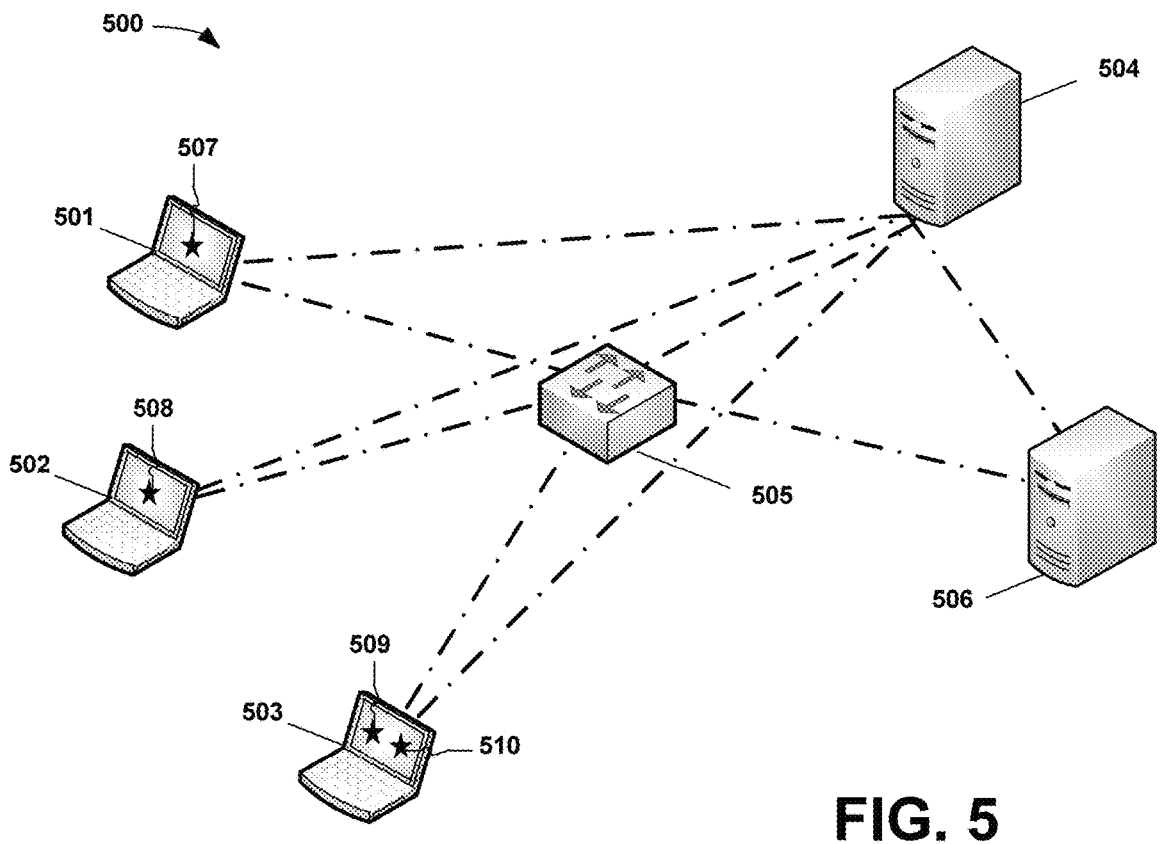
FIG. 5 illustrates an example of a computer network via which a system and method of the present disclosure can be employed.

Turning now to FIG. 5, a computer network 500 in which a system and method of the present disclosure can be employed is depicted. The computer network 500 implements certain protocols and other techniques, including the one disclosed herein, to define a trusted network environment. As shown, computer network 500 includes a plurality of client devices 501-503 via which users (not shown) can access network resources after undergoing an authentication process consistent with the present disclosure. In addition, the example devices (e.g., server 504, switch device 505 and network server 506) within the computer network 500 may be configured such that access is only accomplished through a secure authentication process in response to an implicit state evaluation (e.g., implicit attestation).

In one implementation, each of the plurality of client devices 501-503 may have access to a network resource, such as a network software application (not shown) hosted on a network server 506. The plurality of client devices 501-503 in this particular example are all laptop computers. However, one having ordinary skill in the art should appreciate that the present disclosure is not limited thereto. For example, the plurality of client devices 501-503 may include, but not be limited to, a mobile phone, a laptop computer, a personal computer, a server, a printer, a networked lighting device, a Wi-Fi access point, a network switch device, a building access device (door lock), a networked security camera, or a network router.

In the example of FIG. 5, each of client devices 501-503 has one or more protected memories 507-510, conceptually illustrated in FIG. 5, on which is stored secure information that allows each respective client devices 501-503 to be authenticated to access the network server 506. Each of the protected memories 507-510 may have a state with a unique property. In one implementation, the protected memories 507-510 are embodied as one or more platform configuration registers ("PCR") and the size of the value that can be stored in a PCR can be determined by the size of a digest generated by an associated hashing algorithm. For example, a Secured Hash Algorithm ("SHA")-1 PCR stores a value the sized of SHA-1 digest, or value, that has a size of 20 bytes. It should be understood by those having ordinary skill in the art that the present disclosure is not limited to a single protected memory. The client devices 501-503 may include a plurality of protected memories, each tied to a specific network device or network application. This example illustrates that client device 503 may include protected memory 509 directed to a first network application and protected memory 510 which is directed to a second network application.

Moreover, although the example shown in FIG. 5 includes protected memories 507-510 that are each directed to a single network software application or other network resource, the present disclosure is not limited thereto. In some implementations, any of the protected memories 507-510 associated with a network device or user profile may be directed to one or more network devices or network software applications or other network resources such that access can be granted thereto.

In addition, each of the client devices 501-503 includes a cryptoprocessor as described above and, more particularly, a TPM chip. There may be several PCRs in each TPM chip, so the selection of PCRs used in the sealing may be system specific, according to which PCRs indicate the desired trusted state of the respective client device 501-503. For example, if the boot firmware ("UEFI" or "BIOS") software version is important, only the PCRs that reflect the state of that portion of system state are used in the seal operation. The sealed random data is also persistently stored on the system for later use.

In one example, an authentication process consistent with the present disclosure may be employed for any of the client devices 501-503 to access switch device 505. In another example, an authentication process consistent with the present disclosure may be employed for the switch device 505 to access the network server 506. In yet another example, an authentication process consistent with the present disclosure may be employed for any of the client devices 501-503 to have access with each other. In still another example, an authentication process consistent with the present disclosure may be employed for any of the devices 501-503, 505 to access the server 504 or the network server 506.

It should be understood by those having ordinary skill in the art having the benefit of the present disclosure that some functions of the authentication process disclosed herein may be aggregated into a verification server in some examples. For instance, the server 504 may function as a verification server and participate in the authentication process. However, these verification functions will be limited to some of those functions performed during the enrollment process.

Figure 6:
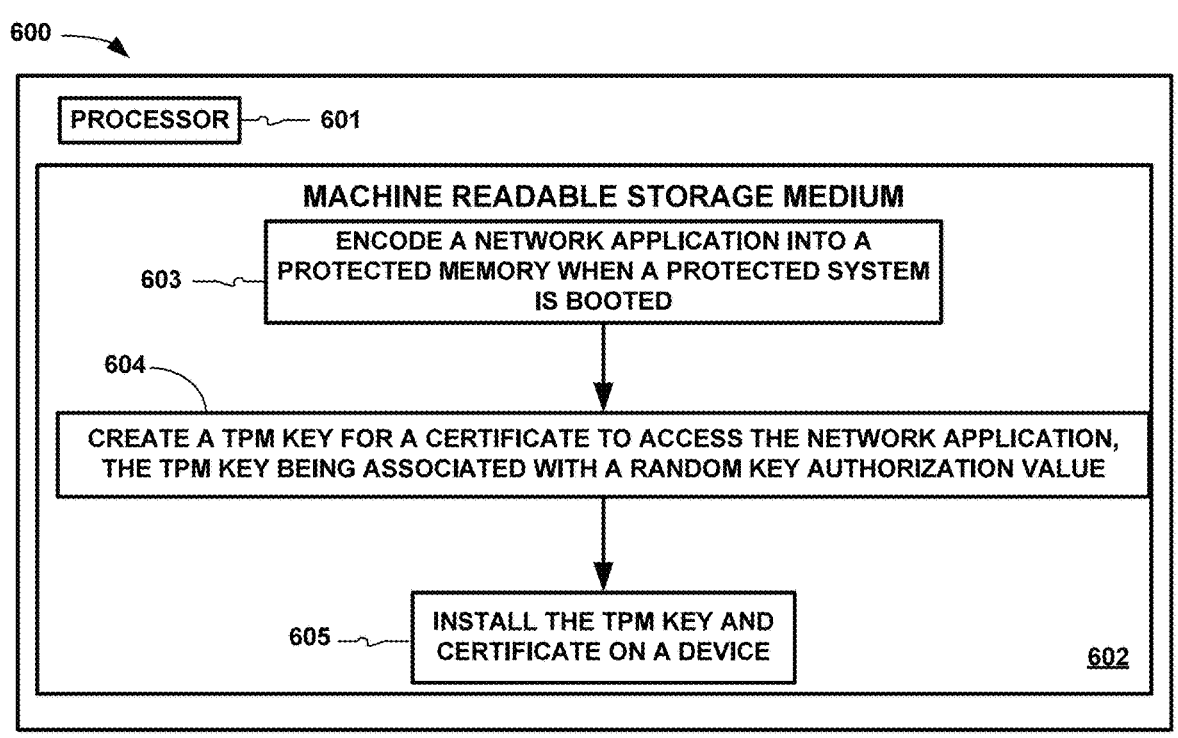
FIG. 6 is an illustration of a computing system, according to one or more examples of the present disclosure.

FIG. 6 is an illustration of a computing system 600, according to one or more examples of the present disclosure. The computing system 600 may be a device in the network 500 shown in FIG. 5, for instance. The computing system 600 may include a non-transitory machine-readable medium 602 that includes computer executable instructions 603-605 stored thereon that, when executed by one or more processing units 601 (one processor shown), causes the one or more processing units 601 to effect a portion of an authentication process consistent with the present disclosure. In particular, the effected portion of the authentication process is a portion associated with enrollment of the computing system 600 into a network. The processing unit 601 may be any suitable kind of processor known to the art including a central processing unit, general processor, a processing chipset, a controller, a microcontroller, etc., depending upon the intended functionality of the computing system. Note that this list is neither exclusive nor exhaustive and that other kinds of processor units may be used in still other examples.

Computer executable instructions 603 include instructions to measure (e.g., compute its hash) the network software application into a memory (e.g., PCRs) which may be part of a trusted boot process. The term "measure" here is used in the sense of a "term measured boot" because the client returns a value, typically a secure hash algorithm (SHA2) digest, of each of the partitions loaded. Note that the protected memory is not shown in FIG. 6. In the event that the state of the protected memory (e.g., PCR values) indicates a trusted version of software, a key authorization value—generated as described above—is sealed to that state and can be unsealed when the system is running the trusted software.

In addition, computer executable instructions 604 include instructions for creating a TPM key for a certificate to access a network application (e.g., network software application). The TPM key is an asymmetric key pair including a private key and a public key. In some implementations, when a TPM key is created for a new LDevID certificate, the system is to be confirmed in a trusted state (e.g., an attestation phase). A new TPM key may be then created with a key authorization value. The key blob may then be stored on the system in a persistent manner. The key authorization value may also be sealed to the TPM chip's current PCR state such that the key authorization value can be recovered when the system is in an expected (e.g., correct) state.

In one implementation, the key authorization value may be a storage of bits (e.g., 160-bit value). The key authorization value may be sealed to a protected memory (e.g., PCR) such that the key authorization value is recoverable when the network software application is in an expected state.

In some implementations, the LDevID certificate is used for "network admission". When the "upstream" network device receives a network access request (e.g. an 802.1X authentication request), the upstream network device provides the LDevID certificate and executes a protocol using the LDevID key. In addition, before using the LDevID, the system supplies the TPM chip with the sealed data and requests an unseal operation. If the system is in a trusted state (as defined by the TPM chip PCR values), then the TPM chip can release the key authorization value.

Next, computer executable instructions 605 include installing the TPM key—both the private key and the public key—and certificate on a device. In one implementation, the created key and certificate is a LDevID-compatible key and certificate that can be employed on TPM chip-equipped devices within a trusted network environment. In the event that a key access value retrieval operation should fail, the network access request will also fail. In some implementations, the upstream network service instead of merely failing network access also grants access to a remediation network and notifies a configured network entity that the newly connected device failed network authentication.

Figure 7:
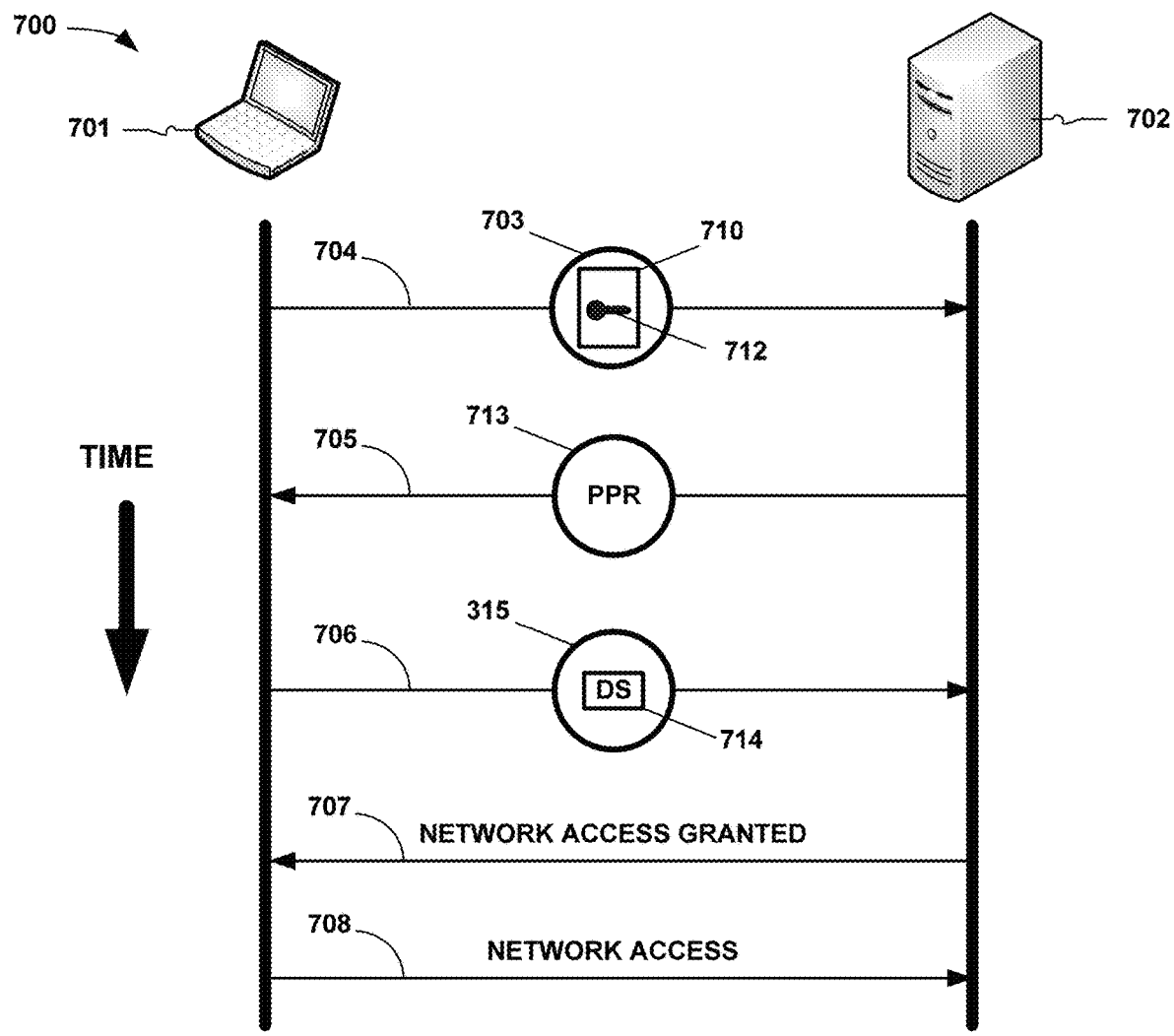
FIG. 7 is an illustration of an authentication process, according to one or more examples of the present disclosure.

FIG. 7 is an illustration of an authentication process 700, according to one or more examples of the present disclosure. The authentication process 700 shown in the figure employs the use of a client device 701 (e.g., laptop device) and a target server 702. However, it should be understood by those having ordinary skill in the art that the authentication process 700 can be employed with more than a single class of client devices and target servers but may be employed with other classes of network devices. In this example, the client device 701 wishes to access a network resource (not otherwise shown) hosted on the target server 702.

In the implementation shown, the authentication process 700 begins with a client device 701 sending a network access request 703 (per path 704) to the target server 702 to access the target server 702. The client device 701 includes, as a part of the request, a certificate 710 including the public key 712. In response to the request, the target server 702 sends (per path 705) a request for a proof of possession request 713 ("PPR") to the client device 701 to authenticate itself by providing its digital signature. As described above, the client device 701 presents to the TPM chip of the client device 701 the client device 701's encrypted and secured current secure information including the key authorization value and the trusted PCR state. The TPM chip will then decrypt and compare the current secure information with its own decrypted trusted state secure information.

If there is a match, the TPM chip releases the key authorization value to the client device 701, which then uses the key authorization device to create its digital signature. (If there is no match, the client device 701 is no longer in a trusted state and is sent to remediation—not shown.) The client device 701 then provides its digital signature 714 (per path 706) as a proof of possession to the target server 702. The target server 702 then signals that access is granted (per path 707) and the client device 701 then accesses the network resource (per path 708).

Figure 8:
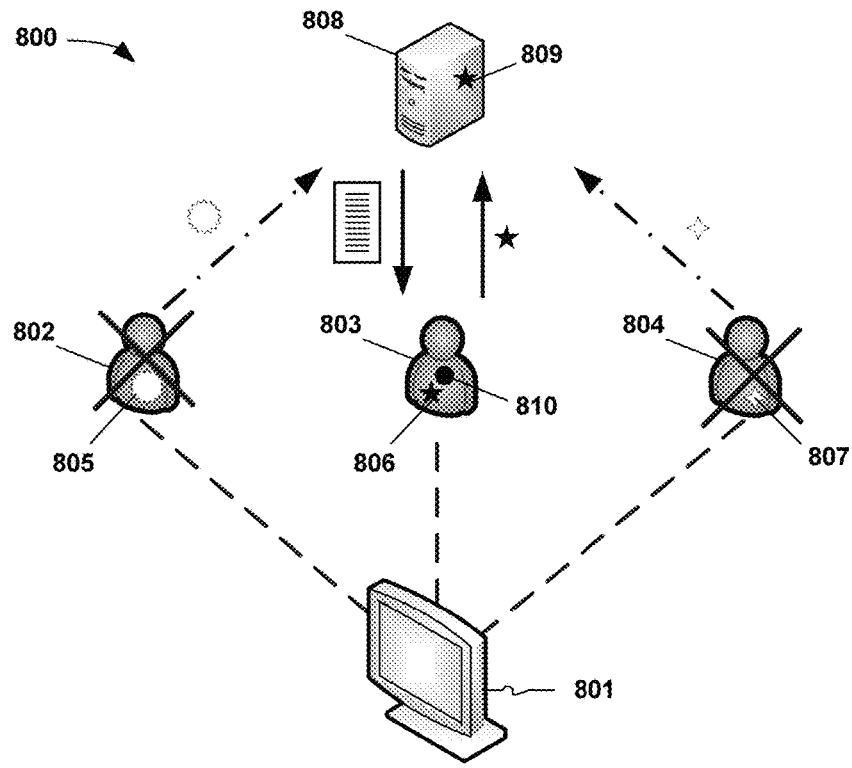
FIG. 8 is an illustration of a computing platform used by several users to access a network software application.

FIG. 8 is an illustration of a computing system 800 used by several user profiles 802-804 to access a network software application 809. The computing system 800 shown in the figure includes a computing device 801 which can be used to access the network software application 809 hosted on a target server 808. In the example shown, target server 808 employs an authentication protocol that is consistent with the present disclosure.

In some implementations, an account associated with a user may have a trusted state defined by one or more protected memory states (e.g., PCRs) to access one or more network software applications. In the example shown, protected memory 805 is associated with user profile 802, protected memory 806 is associated with user profile 803, and protected memory 807 is associated with user profile 804. User profiles 802-804 may employ the states of the protected memory 805-807, respectively, in an attempt to access network software application 809 hosted on the target server 808.

It should be understood by one having ordinary skill in the art that the present disclosure is not limited to a user profile having a single protected memory or trusted state. Accordingly, a user profile may have several trusted states that are directed to several network software applications. For example, user profile 802 has protected memory 806 and protected memory 810. In one implementation, protected memory 806 is directed to access a first network software application while protected memory 810 may be directed to access a second network software application.

In the example shown, the state of protected memory 805 does not permit the user associated with user profile 802 to access the network software application software 809 hosted on target server 808. As such, in the example shown, protected memory 805 is not in an expected state in order for a key authorization value be sent to a user's account hosted on the computing device 801 such that the user associated with user profile 802 has the expected key to access the network software application 809.

Notably, the protected memory 806 is in an expected state in order to access the network software application 809. The server 808 authenticates the computing device 801 under the control of user 806, because 806's key is accessible (for proof of possession) and therefore computing device 801 is authorized to connect to the target server 808 to access the network software application 809.

In one example, a user identified by user profile 802 may utilize the computing device 801 to access the network software application 809 hosted on the target server 808. After the access request is denied, the authentication protocol implemented by the target server 808 may prevent the user identified by the user profile 802 from attempting to re-authenticate. Next, a user identified by user profile 803 may utilize the same computing device 801 to access the network software application 809. Because protected memory 806 is in an expected state, the computing device 801 is allowed to access the network software application 809. However, if a user identified by user profile 804 attempts to utilize the computing device 801 to access the network software application, the request will be denied as the protected memory 807 is not in the expected state. In addition, the authentication protocol implemented by the target server 808 may prevent the user identified by the user profile 804 from attempting to re-authenticate. Accordingly, the authentication protocol implemented on the target server 808 may readily permit and deny access based on the credentials (e.g., trusted states) associated with a requesting device or user profile.

Figure 9:
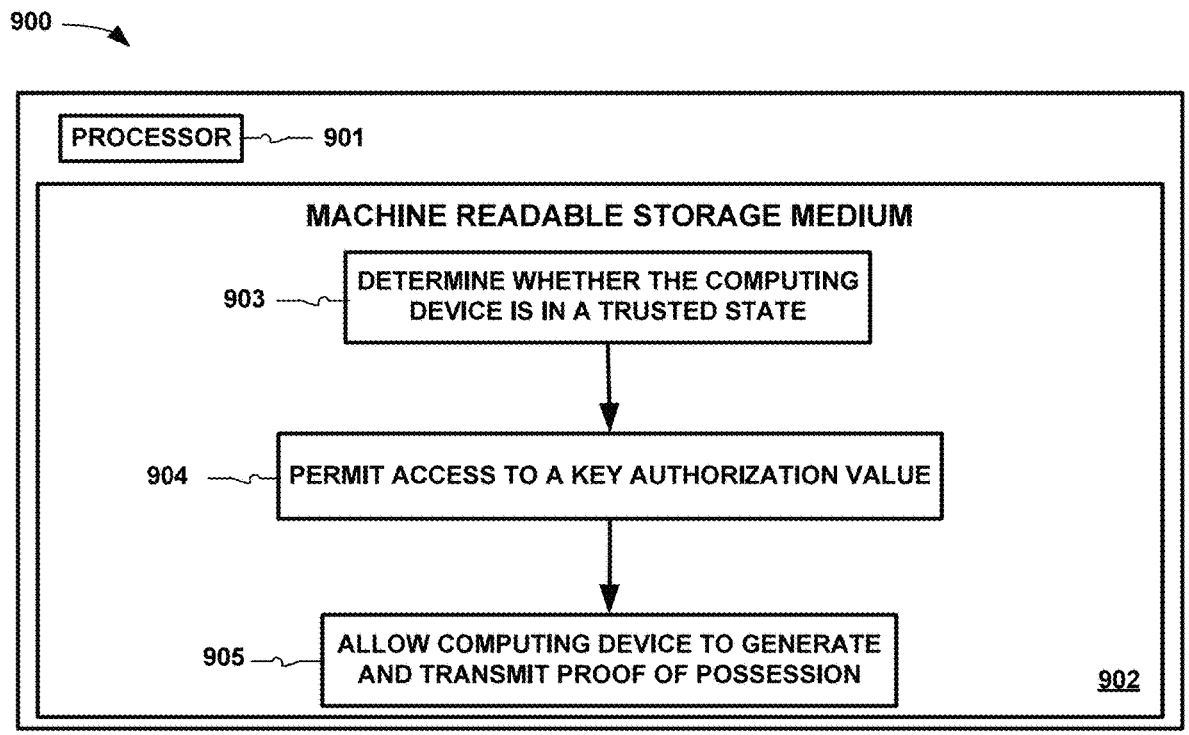
FIG. 9 is an illustration of a computing system, according to one or more examples of the present disclosure.

FIG. 9 is an illustration of a computing system 900, according to one or more examples of the present disclosure. The computing system 900 may be used, depending on the particular example, to implement one or more of the client devices 501-503, the switch device 505 and the network server 506 in FIG. 5. Similarly, the computing system 900 may also be, in some examples, the same computing system as the computing system 600 shown in FIG. 6. However, the computing system 900 may also be used to implement still other types of TPM chip devices in still other examples.

The computing system 900 may include a non-transitory machine-readable medium 902 that includes computer executable instructions 903-905 stored thereon that, when executed by one or more processing units 901 (one processor shown), causes the one or more processing units 901 to provide implicit attestation for network access, according to one implementation of the present disclosure. In the context of the present example, the processor 901 is a cryptoprocessor such as a TPM chip. The machine-readable storage medium is not a part of the protected memory in the illustrated example although it may be in other examples. (In examples where the computing system 900 and the computing system 600 are implemented in the same device, the processor 601 may be different from the processor 901.)

Computer executable instructions include determining (at 903) whether the device is in a trusted state. This includes the implicit attestation described above. If the device is in a trusted state, then the computing system 900 is permitted access to the key authorization value (at 904) to permit the computing system 900 to generate its digital signature. Further, the computing system 900 includes computer executable instructions 905 which allows (at 905) the computing system 900 to generate and transmit a proof of possession.

Figure 10:
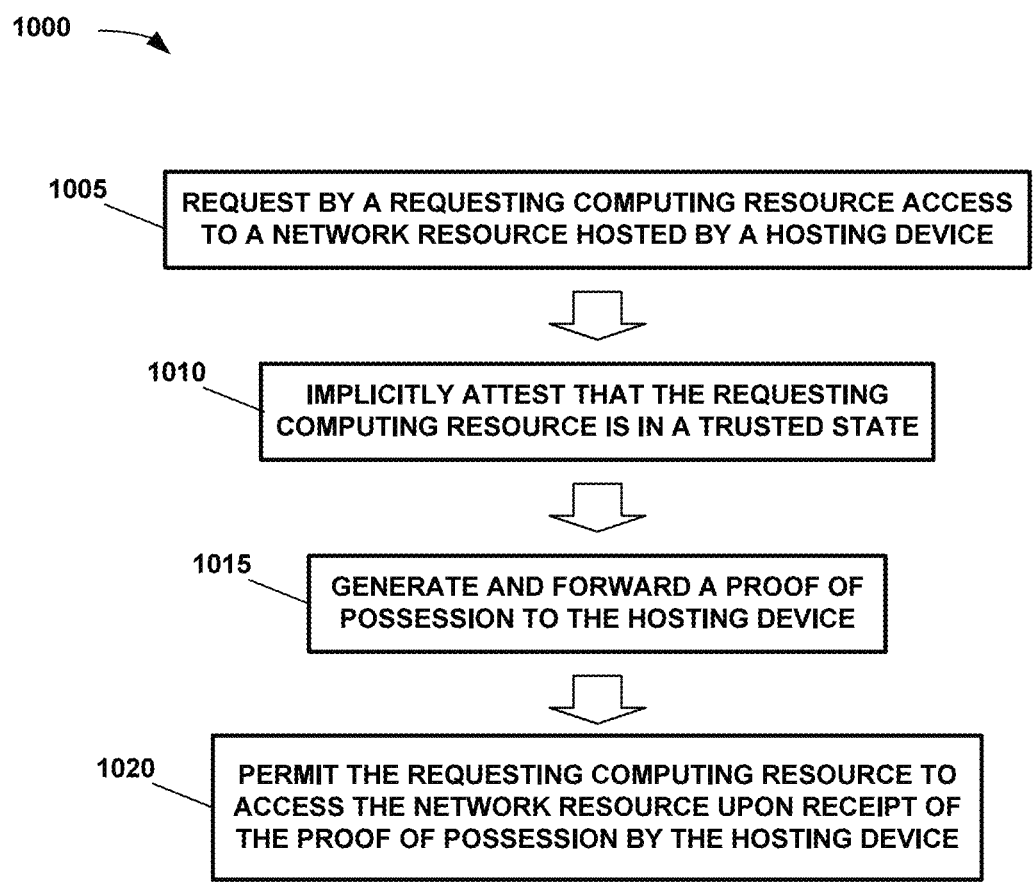
FIG. 10 illustrates a method for use in a trusted network environment in accordance with one or more examples disclosed herein.

Thus, as illustrated in FIG. 10, a method 1000 is disclosed herein for use in a trusted network environment. The method begins by requesting (at 1005) by a requesting computing resource access to a network resource hosted by a hosting device. The requesting computing resource may be, for instance, a device such as device A in FIGS. 1-3 or a user profile such as the user profiles 802-804 shown in FIG. 8. Note that these two example are neither exhaustive nor exclusive of the types of computing resources that may be used with the disclosed implicit attestation technique.

The method 1000 continues by implicitly attesting (at 1010) that the requesting computing resource is in a trusted state. (If the implicit attestation fails, the requesting computing resource is then forced into remediation.) Once the implicit attestation is performed, the method 1000 then generates and forwards (at 1015) a proof of possession to the hosting device. The method 1000 then permits (at 1020) the requesting computing resource to access the network resource upon receipt of the proof of possession by the hosting device.

The implicit attestation is, in at least some examples, generally performed by an apparatus for use in a trusted network environment. The apparatus may include a cryptoprocessor (e.g., the cryptoprocessor 125 in FIGS. 1-2) and a protected memory (e.g., the protected memory 139 in FIGS. 1-2). The cryptoprocessor and the protected memory are communicatively coupled. The apparatus furthermore includes encrypted and encapsulated secure information (e.g., the secure information 137 in FIGS. 1-2) residing in the protected memory. The secure information defines a trusted state for a computing resource. The secure information may include a key authorization value (e.g., the key authorization value 120 in FIGS. 1-2) used when accessing an asymmetric key pair (e.g., the asymmetric key pair 115 in FIG. 1) including a private key (e.g., the private key 135 in FIGS. 1-2) for the computing resource. The apparatus further includes instructions (e.g., the instructions 215 in FIG. 2) residing in the protected memory that, when executed by the cryptoprocessor, cause the cryptoprocessor to perform the implicit attestation described herein.

The apparatus may be a TPM module, such that the cryptoprocessor is a TPM chip. The apparatus may be a part of the requesting computing resource, as is the case in FIGS. 1-3. Furthermore, where the requesting computing resource is a device and the apparatus is a TPM module, the requesting computing resource may be referred to as a TPM device or a TPM platform. In some examples, the apparatus, may be a part of another device (i.e., an authentication device) such as an authentication server. This may be advantageous for certain kinds of computing resources such as the user profiles in FIG. 4.

In some examples, in systems such as a cell phones, the TPM may be implemented in the Trusted Execution Environment ("TEE") running on the same hardware but underlying execution of the main operating system. (CPU has two states: secure world and user world). TEEs are commonly provided by ARM TrustZone on ARM architecture CPUs and in INTEL® SGX on INTEL® architecture CPUs. TEEs are also available in, for example, ADVANCED MICRO DEVICES® ("AMD") CPUs as well as CPUs available from other manufacturers.

Advantageously, the system described herein couples system state validation to a secure network admission process. This permits a secure state to be defined a priori and determines that this state is maintained or make it possible to mandate that a device is to be remediated. In a secure network admission process, this implicit attestation of a device state eliminates, or at least mitigates, a need for attestation (e.g., platform state evaluation) before network access is granted. Advantageously, implicit attestation increases the speed of network admission and also prevents denial of service should the otherwise used central verification or evaluation service be unavailable or busy. This method retains the security of the network access while improving network uptime, particularly after a power disruption (e.g., when all devices boot).

The foregoing description, for purposes of explanation, used specific nomenclature to provide a thorough understanding of the disclosure. However, it may be apparent to one skilled in the art that the specific details are not needed in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for use in implicit authentication in a trusted network environment, comprising:
    verifying that a requesting computing resource is in a trusted state, including:
        presenting, by the requesting computing resource, an encapsulated and encrypted current secure information to a cryptoprocessor, the encapsulated and encrypted current secure information defining the trusted state for the requesting computing resource and including a key authorization value used to generate an asymmetric key pair for the requesting computing resource, the asymmetric key pair including a private key;
        comparing, by the cryptoprocessor, the encapsulated and encrypted current secure information with trusted secure information previously encapsulated, encrypted, and stored in a protected memory by the cryptoprocessor; and
        releasing the key authorization value to the requesting computing resource in response to the comparison indicating the requesting computing resource is in the trusted state;
    accessing the private key using the released key authorization value; and
    creating a digital signature for the requesting computing resource from the accessed private key.

2. The method of claim 1, wherein the cryptoprocessor and protected memory are hosted by an authentication device.

3. The method of claim 1, wherein the cryptoprocessor and protected memory are hosted by the requesting computing resource.

4. The method of claim 1, wherein the requesting computing resource is a requesting user profile or a requesting device.

5. The method of claim 4, wherein the requesting computing resource is the requesting device and the method further comprises:
    requesting, by the requesting device, access to a network resource hosted by a hosting device, the request including a certificate further including a public key, the public key being one of the asymmetric key pair;
    requesting, by the hosting device, a proof of possession from the requesting device;
    accessing, by the requesting device, the proof of possession, including the digital signature; and
    transmitting the generated proof of possession to the hosting device, the generated proof of possession including the digital signature.

6. The method of claim 5, further comprising the hosting device permitting access to the network resource upon receiving the transmitted proof of possession.

7. The method of claim 1, wherein the key authorization value is randomly generated and at least 160 bits long.

8. The method of claim 7, wherein the key authorization value is at least 256 bits long.

9. The method of claim 1, wherein the cryptoprocessor and the protected memory comprise at least a portion of a Trusted Platform Module.

10. The method of claim 1, wherein:
in response to the comparison indicating the requesting computing resource is not in the trusted state, forcing the requesting computing resource into remediation.

11. An apparatus for use in a trusted network environment, the apparatus comprising:
a cryptoprocessor;
a protected memory communicatively coupled to the cryptoprocessor;
encrypted and encapsulated trusted secure information residing in the protected memory, the encrypted and encapsulated trusted secure information defining a trusted state for a computing resource and including a key authorization value used in accessing an asymmetric key pair including a private key for the computing resource;
a second memory communicatively coupled to the cryptoprocessor; and
instructions residing in the protected memory that, when executed by the cryptoprocessor, cause the cryptoprocessor to:
receive, from the computing resource, an encapsulated and encrypted current secure information;
decrypt and de-encapsulate the encapsulated and encrypted current secure information and the stored encrypted and encapsulated trusted secure information;
compare the current secure information with the trusted secure information; and
release the key authorization value to the computing resource based on the comparison indicating the computing resource is in the trusted state.

12. The apparatus of claim 11, wherein the apparatus is a Trusted Platform Module.

13. The apparatus of claim 11, wherein the apparatus comprises a portion of the computing resource.

14. The apparatus of claim 11, wherein the apparatus provides a trusted execution environment to provide the protected memory in addition to protected execution.

15. The apparatus of claim 11, wherein the computing resource is a device or a user profile.

16. The apparatus of claim 11, wherein the instructions further cause the cryptoprocessor to force the computing resource into remediation responsive to the comparison indicating that the computing resource is not in the trusted state.

17. A method for use in a trusted network environment, comprising:
requesting by a requesting computing resource access to a network resource hosted by a hosting device;
implicitly attesting by the requesting computing resource that the requesting computing resource is in a trusted state, the implicit attestation including accessing a proof of possession if the requesting computing resource is in the trusted state, wherein implicitly attesting that the requesting computer resource is in a trusted state comprises:
receiving, at a cryptoprocessor, an encapsulated and encrypted current secure information,
decrypting and de-encapsulating, by the cryptoprocessor, the encrypted and encapsulated current secure information and trusted secure information stored in a protected memory,
comparing, by the cryptoprocessor, the current secure information with the trusted secure information, and
releasing, to the requesting computing resource, a key authorization value to the requesting computing resource if the comparison indicates the requesting computing resource is in the trusted state;
forwarding by the requesting computing resource the proof of possession from the requesting computing resource to the hosting device; and
permitting the requesting computing resource to access the network resource upon receipt of the implicit attestation by the hosting device.

18. The method of claim 17, wherein
the encrypted and encapsulated current secure information defines a current state for the requesting computing resource and includes a key authorization value used in accessing an asymmetric key pair including a private key for the requesting computing resource; and wherein
the trusted secure information is stored in a protected memory and the trusted secure information defines a trusted state for the requesting computing resource and including the key authorization value.

19. The method of claim 17, wherein the implicit attestation fails and the requesting computing resource is forced into remediation rather than being granted access to the network resource.

20. The method of claim 17, wherein the key authorization value is randomly generated and at least 160 bits long.

* * * * *